Aug. 29, 1961     D. D. SMART     2,997,779
AUTOMATIC INSERTER
Filed Aug. 12, 1957     5 Sheets-Sheet 2
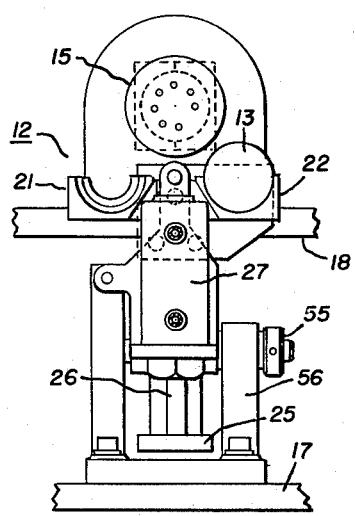
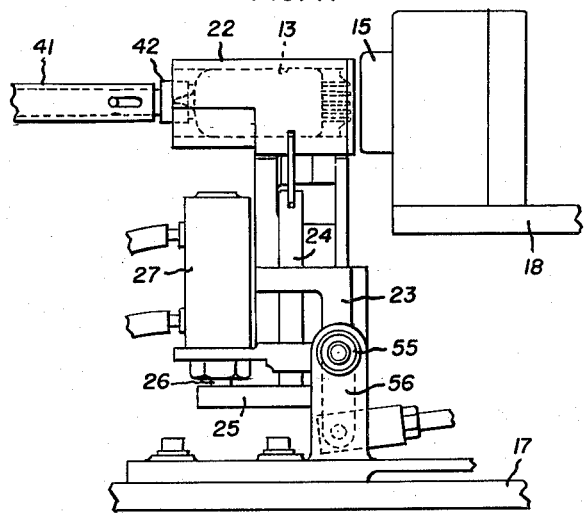
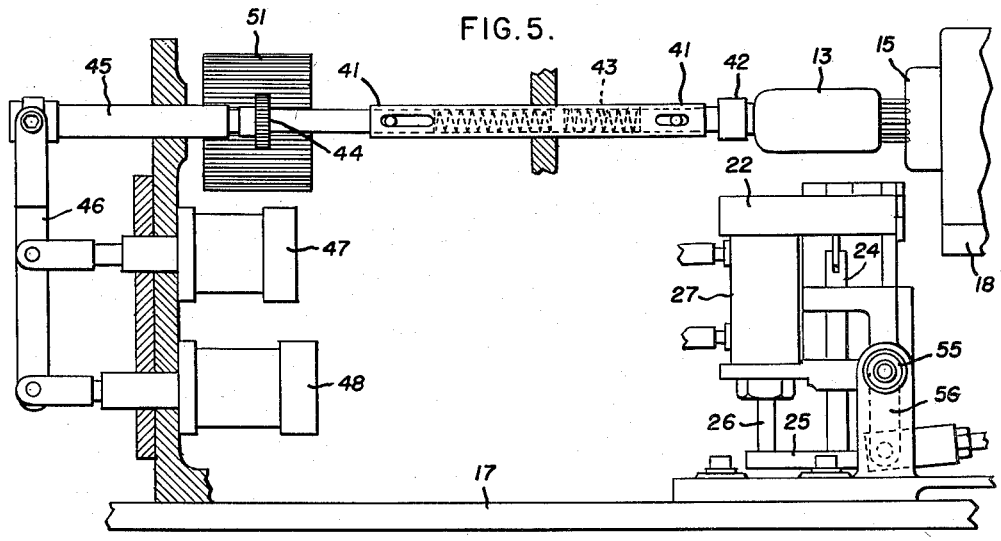
INVENTOR:
DAVID D. SMART,
BY Charles W. Helzer
HIS ATTORNEY.

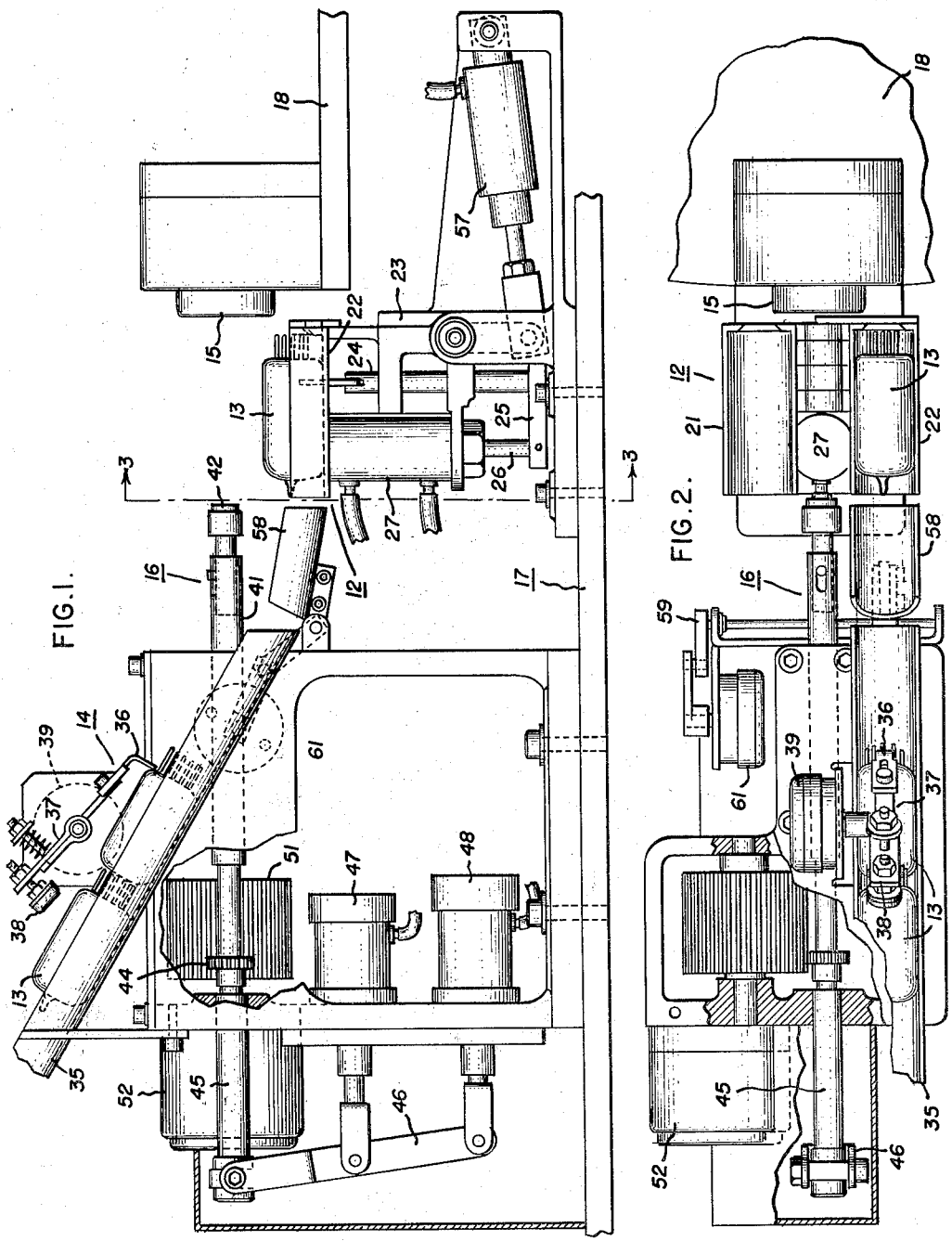
INVENTOR:
DAVID D. SMART,
BY Charles W. Helzer
HIS ATTORNEY.

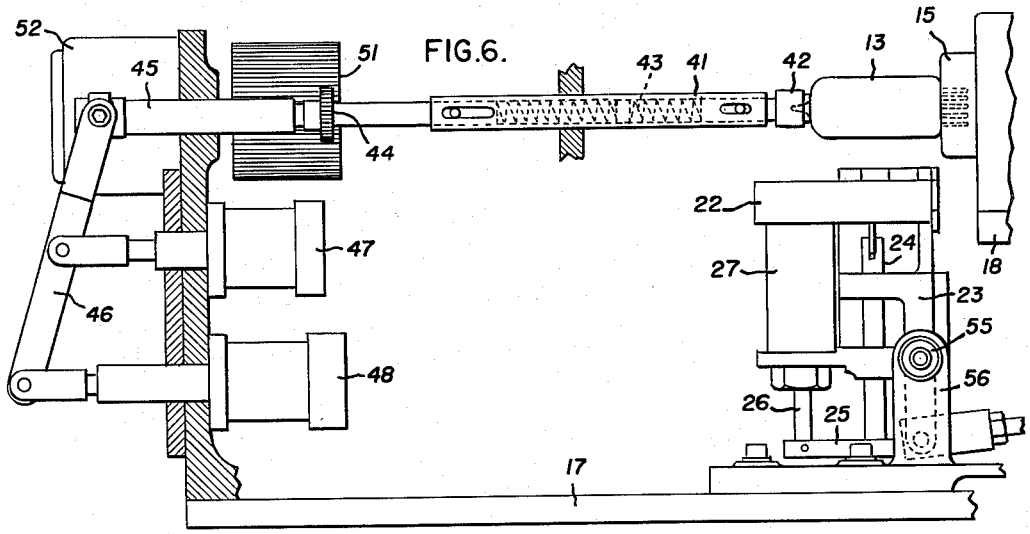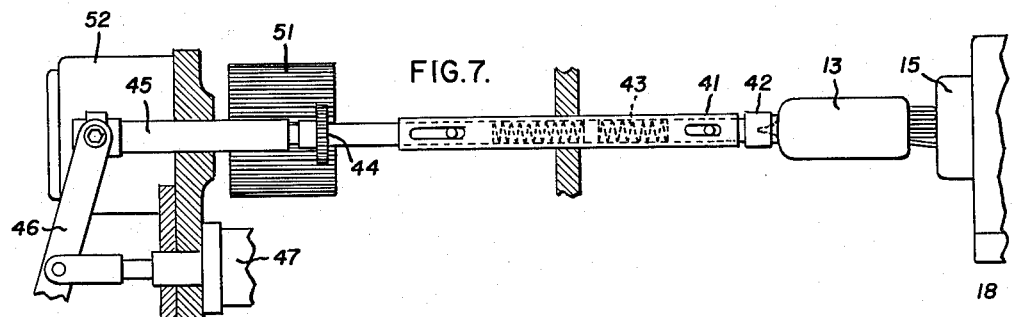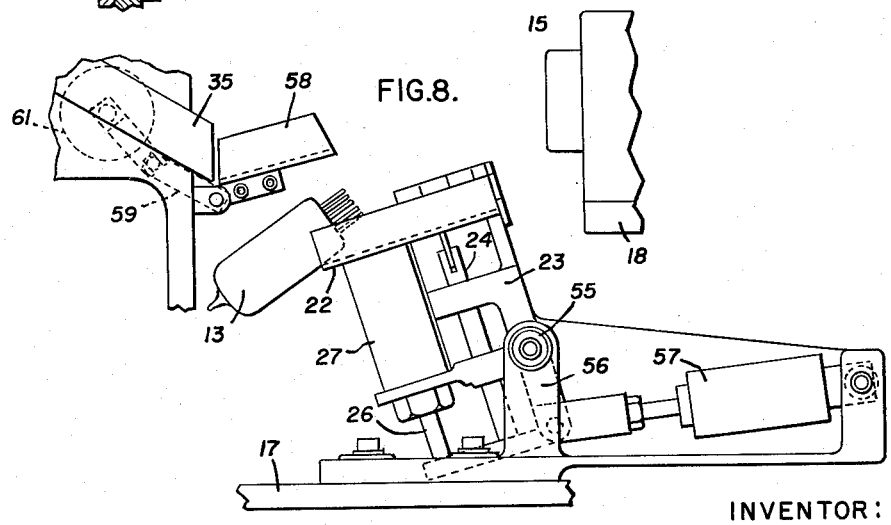

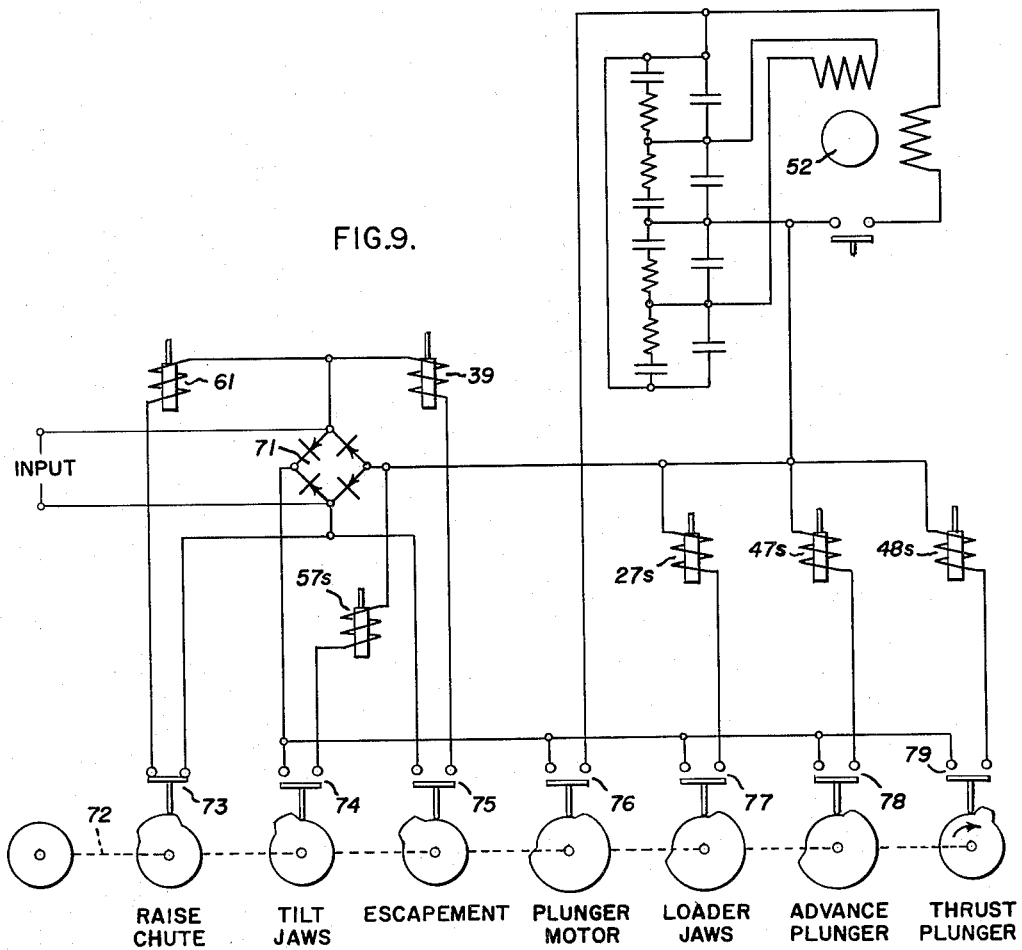

Aug. 29, 1961  D. D. SMART  2,997,779
AUTOMATIC INSERTER
Filed Aug. 12, 1957  5 Sheets-Sheet 5
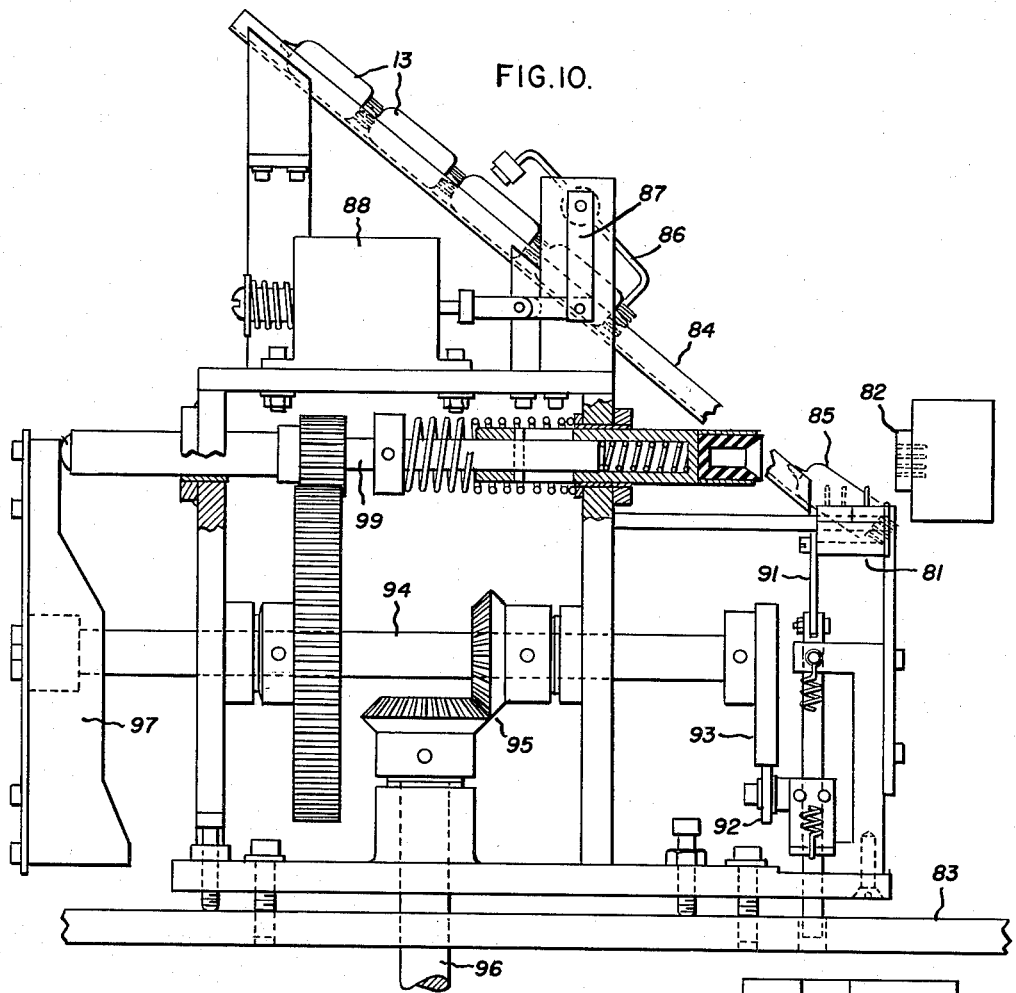
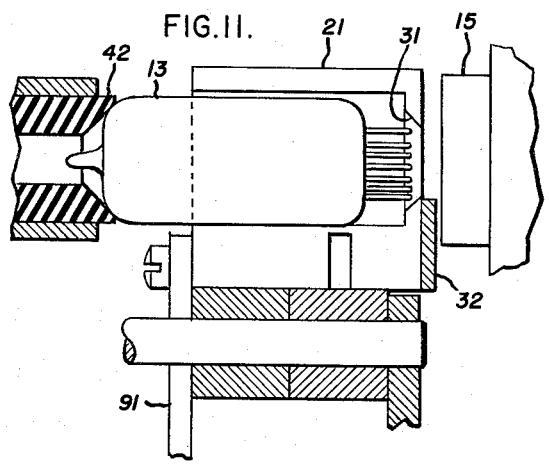
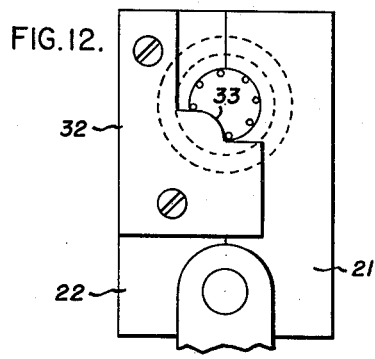
INVENTOR:
DAVID D. SMART,
BY Charles W. Helzer
HIS ATTORNEY.

United States Patent Office 2,997,779
Patented Aug. 29, 1961

2,997,779
AUTOMATIC INSERTER
David D. Smart, Danville, Ill., assignor to General Electric Company, a corporation of New York
Filed Aug. 12, 1957, Ser. No. 677,465
6 Claims. (Cl. 29—203)

This invention relates to an automatic inserter of pronged inserts for use in electronic equipment.

More particularly, the invention relates to a device for automatically inserting pronged inserts such as transistors, electron tubes and the like into sockets adapted to receive such pronged inserts.

In the manufacture of pronged inserts such as electron tubes, transistors and the like, it is essential that each such insert be tested at the end of its manufacture for quality control purposes to determine that the insert operates in the manner for which it was designed. In the past, the testing of pronged inserts, such as electron tubes, was manual in nature in that an operator manually inserted the electron tube to be tested into a socket adapted to receive the tube, and thereafter ran through a series of tests adapted to establish the characteristics of the tube under test. Because of the manual nature of this test it was determined that an automatic tube testing device was required to facilitate production of electron tubes. In order to insure that such automatic tube testing device was indeed truly automatic, it was necessary to provide an automatic inserter or loading mechanism which could automatically load the the pronged inserts or electron tubes into sockets adapted to receive such inserts.

It is therefore one object of the present invention to provide an automatic inserter for automatically loading pronged inserts such as electron tubes into sockets adapted to receive such inserts.

Another object of the invention is to provide an automatic inserter which is relatively simple in construction, and reliable in operation.

In practicing the invention, an automatic inserter is provided which comprises a holding means for holding and positioning pronged inserts such as electron tubes in a predetermined orientation. This holding means is designed to allow freedom for movement of the pronged inserts while in the oriented position along an axis extending in the direction of the prongs on the insert. The automatic inserter further includes means for feeding pronged inserts to the holding means seriatim, and reciprocally operable thrusting means. The thrusting means includes an insert engaging head for engaging the end of the pronged inserts remote from the prongs thereof, and is reciprocally moveable along an axis extending in the direction of the prongs for thrusting the prongs on the inserts into sockets adapted to receive the same. In the specific embodiment of the invention disclosed, the automatic inserter is used in conjunction with a tube testing machine that further includes a turntable having a plurality of tube sockets adapted to index seriatim each socket into tube loading position with respect to the holding means of the automatic inserter. The automatic inserter is of course adjusted to perform all of its operation during the dwell time of the indexing turntable.

Other objects, features and many of the attendant advantages of this invention will be appreciated more readily as the same becomes better understood by reference to the following detailed description, when considered in connection with the accompanying drawings, wherein like parts in each of the several figures are identified by the same referenced character, and wherein:

FIG. 1 is a side elevation view of an automatic inserter constructed in accordance with the invention with a portion of the automatic inserter being broken away to illustrate some of the details of its construction;

FIG. 2 is a plan view of the partially broken away automatic inserter shown in FIG. 1;

FIG. 3 is an end view of the automatic inserter taken through plane 3—3 of FIG. 1 of the drawings, and shows a mechanical jaw comprising a part of the automatic inserter;

FIG. 4 is a side view of the mechanical jaw portion of the automatic inserter illustrated in FIG. 3;

FIG. 5 is a side elevational view of a partially disassembled automatic inserter, and illustrates the construction of the mechanical jaws, together with a pusher rod and associated linkages, and solenoid operated air valves which cooperate with the mechanical jaws in inserting pronged inserts such as electron tubes into a socket adapted to receive the same;

FIG. 6 illustrates the same structural arrangement disclosed in FIG. 5, but shows the construction in a different working position from that illustrated in FIG. 5;

FIG. 7 shows a part of the structural arrangement shown in FIG. 5 and FIG. 6 under conditions where the pronged insert is defective, and illustrates the manner in which the automatic inserter accommodates such defective pronged inserts;

FIG. 8 is a side elevation view of a partially broken away portion of the automatic inserter illustrating another feature of its construction which allows the inserter to accommodate defective pronged inserts;

FIG. 9 is a schematic circuit diagram of a centrol electric switching circuit for controlling the operation of the various electrically operated parts of the inserter;

FIG. 10 is partially broken away side elevation view of a second form of an automatic inserter constructed in accordance with the present invention;

FIG. 11 is a partial side view of one of the mechanical jaws comprising a part of the automatic inserter; and FIG. 12 is an end view of the mechanical jaws showing the same in the closed position.

As best shown in FIGS. 1 and 2 of the drawings, the automatic inserter comprising the present invention includes essentially a means (indicated at 12) for holding pronged inserts such as electron tubes 13 together with a means (indicated generally at 14) for feeding the pronged inserts or electron tubes 13 to said holding means seriatim. The holding means 12 is adapted to position the pronged insert or electron tubes 13 in front of a socket 15 adapted to receive the same upon which event a reciprocal thrusting means (indicated generally at 16) engages the electron tube 13, and thrusts the same into the socket 15. In constructing the invention, it is desirable that all of these elements be mounted on a suitable supporting bracket 17 adjacent a turntable, part of which is shown at 18, or some other suitable device for indexing a plurality of sockets 15 into position adjacent holding means 12 at repeated intervals. The automatic inserter is designed in a manner such that during the dwell time of the turntable 18, the feeding means 14, holding means 12, and thrusting means 16, all operate sequentially to load an electron tube 13 into a socket 15 positioned adjacent the holding means, and to clear the area around the mounted electron tubes so that the turntable 18 can index the installed electron tube out of loading position and index a new socket 15 into loading position with respect to the automatic inserter.

Having described the elemental parts of a complete automatic inserter constructed in accordance with the invention, the details of construction of a preferred working embodiment of the automatic inserter will be described more fully hereinafter. As best illustrated in FIGS. 1 and 2 of the drawings, the holding means 12 comprises a pair of coacting pronged insert or electron tube receiving mechanical jaws 21 and 22. The jaws 21 and 22 comprise open ended semi-cylinders which are dimensioned so that when closed they allow freedom of movement of an electron tube 13 disposed therein along an axis extending in the direction of the pins of the tube. The jaws 21 and 22 are hinged to a supporting structure 23, and are adapted to be opened or closed in the manner illustrated in FIGS. 1 through 3, and in FIG. 4 of the drawings. Jaws 21 and 22 are mechanically linked by a connecting rod 24 that is slidably supported in a mount 23, and by cross bar 25 to a slidably mounted post 26 secured to the piston of an air cylinder 27. The air cylinder 27 is adapted to be controlled by a solenoid operated air valve, not shown, to open and close mechanical jaws 21 and 22. The jaws 21 and 22 are constructed in such a manner that when they are closed, an electron tube 13 disposed therein is properly oriented with respect to the tube socket 15 in a manner best illustrated in FIG. 4 of the drawings. The construction of jaws 21 and 22 is best shown in FIGS. 10 and 11 of the drawings, wherein it can be seen that the jaws are designed in a manner such that the ends thereof toward which the prongs or pins of the electron tube 13 extend, define a chamfered hole 31. The diameter of the chamfered hole 31 is constructed to be equal to the pitch diameter of the pin circle of the electron tube, plus 1 pin diameter as illustrated in FIG. 11 of the drawings. The jaws are designed in this fashion because of the reason that although the center line of the electron tube 13 when the jaws are closed is roughly positioned on the center line of the tube socket 15, the prong or pin circle of the tube is not always concentric with the glass envelope of the tube, and it is necessary to locate the pins themselves rather than the glass envelope only. The chamfered hole 31, by reason of the above-described construction, facilitates location of the pins of the tube. To further properly locate the ends of the electron tube, a plate 32 is secured to the end of the jaw 21 in the manner illustrated in FIG. 11 which has a finger 33 that protrudes inwardly and covers over a part of the chamfered hole 31. Finger portion 33 of plate 32 is designed so that it may be interposed in the void space usually provided in the pin circle of most electron tubes for proper location of the pins of the electron tube in a tube socket. As a provision of this space is standard in most electron tubes, the finger portion 33 can be used to properly orient the pins of an electron tube 13 held in the mechanical jaws with respect to the tube socket 15. The finger portion 33 of the plate is located on the side of the pin circle of the tube in the manner illustrated in FIG. 12 in order to facilitate removal or opening of the mechanical jaws subsequent to initially starting the pins of the electron tube into socket 15 in the manner described more fully hereinafter.

As is best illustrated in FIGS. 1 and 2 of the drawings, pronged inserts or electron tubes 13 are supplied seriatim to the jaw 22 when in the opened position through a means indicated at 14 for feeding the electron tubes seriatim to the jaw 22. The feeding means 14 preferably comprise a gravity operated chute 35 which has the pronged inserts or electron tubes 13 supplied thereto either manually or from the output of a glass envelope sealing machine, or the like that is usually the last machine in a production line for the automatic manufacture of electron tubes of the type shown at 13. The electron tubes 13 are supplied down the chute 35 with the prongs or pins first so that they slide down the chute and engage a stop 36. Stop 36 is arranged on one end of a straight lever arm 37 which has a holding finger 38 disposed on its opposite end. The crank arm 37 is secured to the shaft of a spring biased rotary solenoid 39 which may be actuated to rotate the stop 36 counter-clockwise from the stop position shown in FIG. 1 thereby releasing the electron tube 13 formerly held by the stop, and causing the holding finger 38 to come into contact with, and temporarily to hold the electron tube 13 next in line in the chute 35. Release of the solenoid 39 then allows the stop 36 to be brought back into stopping position, by the bias spring, and lifts the holding finger 38 off of the next electron tube in line in chute 35, allowing it to slide down against stop 36 which retains it in position. In this manner, the stop 36 monitors the electron tubes 13 supplied to jaw 22 through chute 35 in much the same fashion as a gating device. As can be appreciated from the examination of FIGS. 1 and 2 of the drawings, release of an electron tube by the gating device 36 allows an electron tube 13 to slide the rest of the way down the chute 35 pin first into mechanical jaw 22 to the position illustrated in FIG. 2.

Upon a pronged insert or electron tube 13 being disposed in the mechanical jaw 22, the jaws 21 and 22 are closed together by actuation of the air cylinder 27. This operation serves to lift or orient the electron tube 13 into a position such that the center line of the tube 13 is aproximately in line with the center line of the socket 15 into which the tube is to be inserted. Subsequent to this action, the reciprocal thrusting means 16 is actuated.

The thrusting means 16 comprises a pusher rod 41 having an insert engaging, cushioned head 42. As best illustrated in FIG. 11 of the drawings the cushioned head 42 may comprise a piece of soft sponge rubber or the like, the ends of which are slightly chamfered so as to facilitate gripping of the end of the electron tube 13 opposite the pins thereof. The pusher rod 41 further comprises an elongated hollow cylindrical body having a coil spring 43 therein for cushioning the action of the pusher rod, and a small gear wheel 44 keyed thereto. Pusher rod 41 is journaled in an elongated bearing 45 which is linked by a connecting arm 46 to first and second air cylinders 47 and 48, respectively. By constructing the thrusting means in this manner, pusher rod 42 is free to rotate, and is rotated by the gear wheel 44 which is driven by an elongated driving gear 51 with which it meshes, and which is shafted to a reversible electric motor 52. Electric motor 52 is of the type which may be restrained from rotating without injury, such as the motor put out by the Brown Instrument Division of the Minneapolis Honeywell Company, and described in Minneapolis Honeywell Company—Technical Bulletin No. B15–12, and in Technical Instrumentation Data Sheet No. 10.20–2a, and is adapted to be run in either direction so that the pusher rod 41 may be rotated back and forth at any desired rate, or restrained from rotating.

Upon the jaws 21 and 22 being closed to bring the electron tube 13 to a center line position with respect to socket 15, the pusher rod 41 is in the retracted position indicated in FIGS. 1 and 4 of the drawings so that cushioned head 42 is withdrawn, and does not interfere with movement of the jaws 21 and 22. Thereafter, the first solenoid actuated air cylinder 47 is energized causing connecting arm 46 to thrust pusher rod 41 into the opening in the end of the mechanical jaws 21 and 22, and bring the cushioned head 42 into engagement with the end of the electron tube 13, in the manner illustrated in FIG. 5 of the drawings. During this movement gear 44 slides along elongated gear 51 thereby allowing axial movement of pusher rod 41. As best seen in FIG. 4, the inward movement of the cushioned head 42 against the end of electron tube 13 causes the tube to move within the jaws 21 and 22 along an axis extending in the direction of the pins thereof, and causes the pins to pass through the chamfered opening 31. Simultaneously with this action, the motor 52 through elongated driving gear 51 and gear 44 causes pusher rod 41 to be rotated or oscillated back and forth about its central axis. This movement is transmitted through the soft rubber cushioning head 42 to the electron tube 13 so that as the pins move through the chamfered opening 31 in the ends of jaws 21 and 22, they are rotated to a position where the locating finger or projection 33 is properly positioned with respect to the void in the pin circle. Thereafter, the initial forward thrust of the pusher rod 41 is sufficient to cause the ends of the pins of tube 13 to come into contact with and engage the socket 15 so that the tube is started in the socket. While the pusher rod 41 is in this position, and continues to engage the end of the electron tube 13 so as to hold it in the started position, the mechanical jaws 21 and 22 are rotated to the open position by air cylinder 27. Thereafter, the second solenoid actuated air cylinder 48 is actuated causing connecting arm 46 to thrust pusher rod 41 further in the direction of socket 15 thereby seating the electron tube 13 in socket 15. Subsequently, both the solenoid control valves first and second air cylinders 47 and 48 are released, allowing the air cylinders to return pusher rod 41 to its initial starting position as shown in FIG. 1 of the drawings. During the above-described operation, coil spring 43 serves to further cushion the action of the pusher rod 42 against the electron tube 13, and assures against undue breakage of electron tubes 13 under test by absorbing any misalignment due to slippages, and the like in the system.

As illustrated in FIG. 7 of the drawings, coil spring 43 serves the further function of absorbing movement of the pusher rod 41 in the event that one of the prongs or pins of tube 13 is bent out of position, and the electron tube fails to seat properly in the socket 15. In such an eventuality, the coil spring 43 is compressed during the thrusting action of pusher rod 41 caused by actuation of second air cylinder 48, and avoids breakage or crushing of the electron tube 13.

In the event that pronged inserts or electron tube 13 do not properly seat in the socket 15 as described in the preceding paragraph, there is a danger that the tube 13, or some part of it will fall back into the open jaws 21 and 22. To provide for such a contingency, the support 23 for jaws 21 and 22 is hinged at the point 55, and is mechanically linked through a connecting arm 56 to an air cylinder 57. Through this arrangement, the air cylinder 57 can be actuated subsequent to each loading operation so as to rock the jaw 22 forward in the manner illustrated in FIG. 8 of the drawing thereby ejecting any defective tube 13 or part of a tube which might have fallen back down into the jaws 21 and 22 through failure to insert properly in the socket 15. To allow for this rocking movement of the jaws 21 and 22, the end 58 of chute 35 is hinged to the remainder of the chute. The end portion 58 of chute 35 is also connected through a mechanical linkage 59 to a rotary solenoid 61 best shown in FIG. 2 of the drawings which serves to rotate the end 58 of chute 35 upwardly out of the way of the jaws 21 and 22 during the actuation of air cylinder 57 and ejectment of any undesired part or electron tube which failed to seat properly in socket 15.

The various solenoid operated devices described in the preceding portion of the specification are all connected in a control electric switching circuit for sequentially energizing each of said solenoid actuated devices in accordance with a preselected program. This control electric switching circuit is illustrated in FIG. 9 of the drawings, and comprises a rectifier bridge circuit 71 adapted to be energized from a source of alternating electric current, not shown. The direct electric current derived across the rectifier bridge 71 is supplied to the various solenoid operated devices through a bank of cam operated switches to be described more fully hereinafter. The cam operated switches may be operated separately from a control cam in a manner such that sequence of operations to be carried out by the automatic tube inserter, is completed during an allowed time interval, or they may be mechanically linked with a master control cam of an overall machine including the automatic inserter as a part thereof in a manner such that the sequence of operation of the automatic inserter is completed during the allowed dwell time of the master control cam. In any event, the cam operated switches are operated from a control timing cam indicated at 72, and comprise a first cam operated switch 73 designed to close solenoid 61 which in turn raises the portion 58 of chute 35. Subsequently, cam operated switch 74 is closed, energizing solenoid 57s which results in actuating air cylinder 57 and rocking or tilting the jaws 21 and 22 forward in the manner illustrated in FIG. 8 of the drawings. Subsequent to these operations, the cam operated switch 75 closes, energizing rotary solenoid 39 which functions to release one of the electron tubes 13 held in chute 35, allowing the electron tube to travel the remainder of the way down chute 35 and onto mechanical jaw 22 in the manner illustrated in FIG. 2 of the drawings. Thereafter, the cam operated switch 76 operates to close the field of motor 52 which rotates pusher rod 41 first in one direction and then the other through the medium of elongated driving gear 51 and gear 44 keyed to pusher rod 41. Just prior to actuation of the pusher rod motor 52, the jaws 21 and 22 are closed by air cylinder 27 which is actuated by a solenoid operated air valve indicted at 27s that in turn is energized by a cam control switch 77.

Immediately after the jaws 21 and 22 have positioned an electron tube 13 in proper orientation with respect to the tube socket 15, a cam operated switch 78 is closed which actuates the first air cylinder 47 through the medium of solenoid control valve 47s to initially advance the pusher rod 41 into position whereby the cushioned head 42 engages the end of the electron tube. Simultaneously with this action, the plunger motor 52 rotates pusher rod 41 first in one direction and then in another. Accordingly, after the cushioned head 42 engages the electron tube 13 it is rotated within the jaws 21 and 22, and simultaneously advanced towards the socket 15 for a distance sufficient for the prongs or pins of the electron tube to extend through the chamfered opening 31 in the ends of the jaws, and to start into the socket 15. Subsequent to this action the cam operated switch 77 is allowed to open thereby de-energizing the solenoid valve 27s controlling the air cylinder 27, and allows the air cylinder to open the jaws 21 and 22. A cam operated switch 79 is then closed, energizing solenoid 48s which in turn actuates second air cylinder 48 causing the pusher rod 41 to be thrust the remainder of the distance toward socket 15 causing the same to seat the electron tube 13 in the socket. Release of the cam operated switches 78 and 79 then causes the pusher rod 41 to be retracted to its initial starting position by the air cylinders 47 and 48 thereby conditioning the automatic inserter for a new cycle of operation.

From the foregoing description, it can be appreciated that the invention provides a new and improved automatic inserter for automatically loading electron tubes or other pronged inserts into sockets adapted to receive such inserts or tubes at a relatively rapid rate. The device is relatively simple in design and construction, and is reliable in operation in that it contains certain fail-safe features which allow the automatic inserter to accommodate almost all imagineable conditions of operation.

While a preferred embodiment of the invention has been described in the preceding pages, it is of course possible to construct the invention in other forms. One such other form is illustrated in FIG. 10 of the drawings which comprises a tube holder means formed by a pair of mechanical jaws 81 which are adapted to be closed, and in the closed position serve to properly orient an electron tube 13 or pronged insert contained therein with respect to a socket 82. The socket 82 may be one of a plurality of sockets on a turntable adapted to be indexed into loading position at spaced intervals to have electron tubes or pronged inserts mounted therein by the automatic inserter. The automatic inserter may be mounted adjacent to such a turntable by a mounting plate 83. Also supporting on the mounting plate 83 is a chute 84 for feeding pronged inserts or electron tubes 13 seriatim to the jaws 81. For this purpose a gating device 86 may be mounted on the inserter which is actuated through a linkage 87 by a spring biased rotary solenoid 88. The spring biased solenoid 88 is operated by the electrical timing circuit for the turntable upon which the tube socket 82 so that release of an electron tube 13 down chute 84 is synchronized with the arrival of a tube socket 82 to receive the tube. Upon release of a pronged insert or electron tube 85 into the mechanical jaws 81, the jaws are closed through a spring biased mechanical linkage 91 secured to a cam roller 92 adapted to follow a cam 93. The cam 93 is keyed to a drive shaft 94 which is in turn driven through a bevel gear arrangement 95 by a main drive shaft 96. The main drive shaft 96 is rotated in synchronism with the turntable upon which the tube socket 82 is mounted so that the sequence of operations conducted by the tube inserter is timed with respect to movement or indexing of the tube sockets 82 into and out of tube inserting position. The mechanical jaws 81 may be identical in construction to the jaws 21 and 22 described in the embodiment of the invention disclosed in FIGS. 1 through 9, and are biased to a normally open position by the connecting arms 91 whose up or down position is controlled by the cam roller 92, and position of driving cam 93. As illustrated in the drawing, the cam 93 is in the down position, and consequently jaws 81 are in the open position. Upon rotation of the cam 93 to the up position, the cam roller 92, and connecting arms 91 are urged upwardly by biasing springs, thereby raising jaws 81 to the up position. Upon raising the mechanical jaws 81 to the up position, pronged inserts or electron tubes 13 are oriented with respect to the tube socket 82.

Also connected to the drive shaft 94 is a cam plate which is engaged by the end 98 of a pusher rod 99 having a cushioned head for engaging the ends of the pronged inserts or electron tubes remote from the prongs or pins thereof. The cam plate 97 is shaped in a manner such that rotation of the drive shaft 94 sequentially brings into engagement with the end of 98 of pusher rod 99 different levels of surfaces causing the pusher rod to reciprocally move in two separate distinct movements back and forth along its central axis. Rotation of the cam plate 97 from the position shown causes the pusher rod 99 to be thrust forward in a first movement a sufficient distance to engage the end of the pronged insert or electron tube remote from the pins thereof in the closed jaws 81, and causes the tube to be moved in the direction of the socket 82 a distance sufficient to force the pins through the chamfered hole in the end of the jaws, and to start into the socket 82. When the second raised surface portion on the cam plate 97 comes into engagement with the end 98 of the pusher rod 99, the gear on rod 99 is disengaged from the gear on shaft 94 so that there is no force tending to rotate the pronged insert on electron tube as it is pushed into the socket. Subsequent to this action, the mechanical jaws are opened through the action of cam 93, and thereafter a second raised surface portion on the cam plate 97 comes into engagement with the end 98 of the pusher rod 99 causing the pusher rod to thrust the pronged insert or electron tube the rest of the way into the tube socket 82. Continued rotation of the cam plate 97 then brings the depressed surface portion of the cam plate into engagement with the end 98 of pusher rod 99, thereby allowing the pusher rod to be retracted back into its illustrated initial starting position. This sequence of operation was initiated by indexing of the socket 82 into tube receiving position, and the feeding of a pronged insert or electron tube 13 down the chute 84 by the gating device 86 into jaws 81.

From the foregoing description it can be appreciated that applicant's invention provides an entirely new automatic inserter for pronged inserts such as electron tubes and the like. The automatic inserter is relatively simple in construction, and reliable in its operation. While the particular embodiments of the invention disclosed have been designed primarily for use in inserting electron tubes in equipment for testing characteristics of electron tubes and the like, it is believed obvious that the inserter has application in a large number of equipments designed for use for automatic insertion of pronged devices such as transistor, electron tubes, and other plug-in type components for electrical and electronic equipment.

Obviously, therefore, other modifications and variations of the present invention are possible in the light of the above teachings, and it is to be understood that the changes that may be made in the particular embodiment of the invention described which are within the full intended scope of the invention as defined by the appended claims.

What I claim as new and desire to secure by Letters Patent of the United States is:

1. An automatic pronged insert loading device comprising a pronged insert open ended holding means for holding and positioning pronged inserts in a predetermined orientation, said holding means allowing freedom of movement for the pronged inserts in the oriented position along an axis extending in the direction of the prongs, means for feeding pronged inserts to said holding means seriatim, and reciprocal thrusting means having an insert engaging head for engaging the ends of said pronged inserts remote from the prongs thereof upon the inserts being held in the oriented position, said reciprocal thrusting means being reciprocally moveable along an axis extending in the direction of the prongs on said inserts for thrusting said prongs into sockets adapted to receive the same, said thrusting means including a fail safe portion axially compressible under overload to permit said head to remain stationary during advance of the remainder of said thrusting means, and yieldable means for rotating said thrusting means about its axis of reciprocation while it is in engagement with the insert.

2. The combination set forth in claim 1 further characterized by drive means connected to said reciprocal thrusting means for moving said thrusting means in the direction of the prongs on said pronged inserts in two separate distinct movements, the first movement being sufficient to start the prongs of the insert into a socket and temporarily hold the insert in the started position, and the second movement being sufficient to seat the insert in the socket, and means for removing the holding means from around the insert intermediate the first and second movements of said reciprocal thrusting means.

3. An automatic electron tube loading device including a pair of coacting open ended jaws, said jaws in the closed position defining an axial opening dimensioned to accommodate the electron tube pins, said opening being located on the end of the jaws toward which the pins of the electron tube extend, a finger on said jaws extending radially relative to said opening in the closed position of said jaws and orientingly engageable with said tube pins to rotationally position the electron tube in a predetermined orientation and allowing freedom for movement of the electron tube in the oriented position along an axis extending in the direction of the pins, rotatable and axially reciprocal thrusting means having an electron tube engaging head for engaging the end of said electron tubes remote from the pins thereof upon the electron tube being held in the oriented position, said reciprocal thrusting means being reciprocably moveable along an axis extending in the direction of the pins of the electron tubes for thrusting the pins into sockets adapted to receive the same, drive means connected to said reciprocal thrusting means for moving said thrusting means in the direction of the pins on said electron tubes in two separate distinct movements, the first movement being sufficient to start the pins of the electron tube into a socket and temporarily holding the tube in started position, and the second movement being sufficient to firmly seat the tube in the socket, said thrusting means including a fail safe portion axially compressible under overload to permit said head to remain stationary during advance of the remainder of said thrusting means, and means for closing said coacting jaws prior to the first movement of said thrusting means and opening said jaws intermediate the first and second movements of said reciprocal thrusting means.

4. The combination set forth in claim 3 further characterized by means for rotating said electron tubes in either direction about the central axis thereof during said first movement of the tubes by said reciprocal thrusting means to facilitate insertion of the pins of the tube into the socket for receiving the same.

5. An insert loading device for loading inserts having prongs extending axially from one end into sockets having prong receiving openings, said device comprising a holder for supporting an insert for free movement along its axis and rotatively about said axis, said holder having an open end through which an insert supported therein is adapted to be expelled by axial movement thereof, a rotatable and axially reciprocable pusher operatively associated with said holder for axially displacing an insert in the holder toward the open end of the holder, drive means operatively associated with said pusher for axially moving said pusher, frictional means on the pusher for frictionally detachably engaging an insert in the holder, yieldable means operatively associated with said pusher for rotating the pusher about the axis of an insert in the holder during axial movement of said pusher, and insert locating means associated with the holder including a stationary finger on the holder partially obscuring the open end of the holder and engageable with prongs of an insert in the holder in a selected rotative position of the insert to prevent further rotation of the insert.

6. Apparatus according to claim 5 wherein said holder includes a plurality of portions movable relatively to and from an insert supporting position, and said finger is carried by one of said portions of said holder.

References Cited in the file of this patent

UNITED STATES PATENTS

| | | |
|---|---|---|
| 1,808,301 | Ferguson | June 2, 1931 |
| 1,920,662 | Palm | Aug. 1, 1933 |
| 2,264,738 | Blann | Dec. 2, 1941 |
| 2,296,964 | Ushakoff | Sept. 29, 1942 |
| 2,602,361 | Meyer | July 8, 1952 |
| 2,673,391 | Goodwin | Mar. 30, 1954 |
| 2,694,792 | Kewley | Nov. 16, 1954 |
| 2,760,393 | Stough | Aug. 28, 1956 |
| 2,877,541 | Bishop | Mar. 17, 1959 |